United States Patent [19]

Müller

[11] Patent Number: 5,214,596
[45] Date of Patent: May 25, 1993

[54] SYSTEM FOR DETERMINING THE AIRSPEED OF HELICOPTERS

[75] Inventor: H. Burkhard Müller, Frankfurt am Main, Fed. Rep. of Germany

[73] Assignee: Duetsche Forchungs- und Versuchsanstalt fur Luft- und Raumfahrt e.V., Fed. Rep. of Germany

[21] Appl. No.: 840,611

[22] Filed: Feb. 20, 1992

Related U.S. Application Data

[63] Continuation of Ser. No. 696,300, Apr. 29, 1991, abandoned, which is a continuation of Ser. No. 523,171, May 14, 1990, abandoned, which is a continuation of Ser. No. 406,856, Sep. 13, 1989, abandoned, which is a continuation of Ser. No. 286,370, Dec. 19, 1988, abandoned, which is a continuation of Ser. No. 62,770, Jun. 15, 1987, abandoned.

[30] Foreign Application Priority Data

Jun. 14, 1986 [DE] Fed. Rep. of Germany ....... 3620177

[51] Int. Cl.$^5$ .............................................. G06F 15/50
[52] U.S. Cl. .................................. 364/565; 364/150; 364/434; 244/17.13
[58] Field of Search ................ 364/150, 151, 149, 433, 364/434; 244/17.13, 17.17

[56] References Cited

U.S. PATENT DOCUMENTS

| | | | |
|---|---|---|---|
| 4,023,409 | 5/1977 | Durand | 73/178 |
| 4,092,716 | 5/1978 | Berg et al. | 364/150 |
| 4,300,200 | 11/1981 | Doe | 364/565 |
| 4,355,358 | 10/1982 | Clelford et al. | 364/150 |
| 4,382,283 | 5/1983 | Clelford et al. | 354/434 |
| 4,567,564 | 1/1986 | Bittner et al. | 364/434 |

OTHER PUBLICATIONS

Rainer Schwäble, "Versuche in der BO 105 zur Messung der Fahrt und des Windes" Litton Technische Werks, no date.
Evaluation of the Helicopter Low Airspeed System Lassie, by J. Kaletka, Deutsche Forschungs- und Versuchsanstalt für Luft- und Raumfahrt e.V., Germany, no date.
Flight Evaluation Pacer Systems Low-Range Airspeed System LORAS 1000. U.S. Army Aviation Engineering Flight Activity, California. May 1977.
A New Internal Low Airspeed System for Helicopters, by J. Mandle. Aerospace Division Crouzet, France. May 20, 1985.
A Method of Helicopter Low Airspeed Estimation based on Measurement of Control Parameters, by A. J. Faulkner et al. Messerschmitt-Bölkow-Blohm GmbH, Germany. Sep. 1979.
Flight Investigations of a Helicopter Low Airspeed Estimation System Based on Measurement of Control Parameters, by A. J. Faulkner et al. Messerschmitt-Bölkow-Blohm GmbH, Germany. Sep. 1980.

Primary Examiner—Thomas G. Black
Attorney, Agent, or Firm—Salter, Michaelson & Benson

[57] ABSTRACT

System for determining the airspeed of helicopters, having a coupled measuring device to which is supplied by the cyclic and collective control signals, the attitude angles and the rotational velocities about the axes of the helicopter. The measuring device contains two models, namely a first model of the input behaviour of the helicopter motion, on which the cyclic and collective control signals act as input, and a second model of the system behaviour of the helicopter, on which the condition parameters act as input parameters. The estimated state parameters are obtained in an integration stage by integration of the algebraic sum of the outputs of the two models and the output signal of the correction arrangement, from which the values of the the velocity components are supplied to an indication. The integration stage is connected in front of a correction arrangement for the measured parameters of the rotational velocity and the attitude angle. There is further provided an arrangement for the compensation of steady state model errors.

8 Claims, 5 Drawing Sheets

SYSTEM FOR DETERMINING THE AIRSPEED OF HELICOPTERS

This is a file wrapper continuation of application Ser. No. 07/696,300 filed Apr. 29, 1991 and now abandoned, which is a continuation of application Ser. No. 07/523,171 filed May 14, 1990 and now abandoned, which is a continuation of application Ser. No. 07/406,856 filed Sep. 13, 1989 and now abandoned, which is a continuation of application Ser. No. 07/286,370 filed Dec. 19, 1988 and now abandoned, which is a continuation of application Ser. No. 07/062,770 filed Jun. 15, 1987 and now abandoned.

BACKGROUND OF THE INVENTION

The invention concerns a system for determining the airspeed of helicopters by using the cyclic and collective control position signals and the attitude angles for the pitch and roll attitudes.

The wide duty spectrum of modern helicopters demands increasingly accurate knowledge of the current flight condition, particularly the airspeed. Determining the airspeed in helicopters, however, is found to be difficult. Since the range of flight conditions includes extremely slow flight—extending to hover flight and even reverse flight—the principle of differential pressure measurement as a basis for velocity determination, well-proven in the case of aircraft, fails in this case. Furthermore, since helicopter flight can occur—even outside the low speed range—at very large total angles of incidence and yaw, rigidly installed velocity sensors, such as are used in aircraft, are inadequate. The installation of conventional incidence and yaw angle instruments is not permissable either because, in helicopters, it is almost impossible to find a measurement location suitable for a wide range of flight conditions; this is because all the components are affected by the main or tail rotor airflow to a greater or less extent.

The high level of interest in an airspeed system for helicopters—but also the difficulty of speed determination—is sufficiently indicated by the number and variety of the various measuring methods described below. Both the currently used sensor systems and the indirect systems being developed, the so-called analytic methods, satisfy the above accuracy requirements only at great expense or for limited flight ranges so that an improved system seems desirable.

For the reasons quoted above, systems have been developed specially for low speed flight in helicopters in order to determine the airspeed and, among these, it is possible to distinguish between relatively direct and purely indirect measuring methods.

The more direct methods include, for example LORAS—Low Range Airspeed System. The sensor consists of two venturi nozzles mounted at the ends of a rotatably supported arm and connected to a differential pressure signal generator, these rotate at 720 r.p.m. and are driven by a motor. A typical installation location is above the rotor head.

When flow arrives at the system rectangularily to the axis of rotation, the difference in the depression in the two venturi nozzles causes, during one revolution, a sine-shaped signal whose maximum amplitude is proportional to the translational velocity and whose phase position determines the yaw angle. The evaluation of the measurement with respect to magnitude and phase takes place in a computer unit.

The more direct methods may also be considered to include the LASSIE SYSTEM—Low AirSpeed Sensing Indication Equipment—a pilot and incidence probe with a gimbal suspension, a permissable incidence angle range of $0° \leq \alpha \leq 360°$ and a permissable yaw angle range of $-60° \leq \beta \leq 60°$. The probe is mounted on an outrigger at the side of the fuselage under the main rotor.

In LASSIE, the slow speed flight and high speed flight operating ranges have to be distinguished. In slow speed flight, the sensor is in the rotor downwash. The quite high downwash velocity of the rotor is superimposed on the airspeed at this point so that the dynamic pressures can be satisfactorily resolved. The longitudinal and transverse components $u_A$ and $v_A$ can be calculated from the arriving flow angles $\alpha, \beta$ and the corresponding trigonometrical relationships. In high speed flight, the sensor is outside the rotor downwash so that the vertical component $w_A$ can also be determined.

Whereas, in high speed flight, the measuring principle of the LASSIE system can be directly compared with the corresponding sensors on winged aircraft, in low speed flight, conclusions on the airspeed are drawn from the arriving flow resulting from the airspeed and the rotor downwash. Investigations have shown that the LASSIE system provides different levels of accuracy depending on whether the sensor is inside or outside the rotor downwash. If lateral and vertical flight conditions are also taken into account, the transition range, in which the LASSIE sensor is in the region of the rotor vortex and supplies very erroneous results, is quite large. The complicated flow relationships at the measurement location make extensive calibration of the LASSIE system necessary. The calibration results make it possible to compensate for the errors as a function of the flight condition.

Both the LORAS and LASSIE systems are available in series versions and are used on various types of helicopters. Disadvantages of both systems, apart from the currently mediocre accuracy, are weight, complicated structure and high price. In addition, the systems are very vulnerable and redundancy can only be achieved at substantial expense.

As an alternative to the systems quoted, methods have appeared in recent years in which the airspeed is calculated from the measurement parameters of control positions, attitude angles and rotational velocities. Such systems are the VIMI method—Vitesse Indiquée par Moyen Internes, the FAULKNER method and LAASH—Litef Analytical Airspeed System for Helicopters. A fundamental advantage of these systems is the low vulnerability.

The VIMI method is based on the trim equations of the helicopters, which describe the equilibrium between the weight, drag and thrust forces. In order to determine the airspeed components, the trim equations are greatly simplified and rearranged; the longitudinal $u_A$ velocity component can then be described as a function of the longitudinal control $\delta_L$ and the pitch angle $\theta$ and the transverse velocity component $v_A$ can be described as a function of the lateral control $\delta_Q$ and the roll angle $\Phi$:

$$u_A = h_1 \delta_L + h_2 \theta, \tag{1}$$

$$v_A = h_3 \delta_Q + h_4 \Phi. \tag{2}$$

In the further developed Super-VIMI version, additional dependencies on the collective control $\delta_K$, the helicopter mass m and the air density p are taken into account in both equations. Details of these additional terms are not known.

From company information, the accuracies achieved are very good. The extent to which the method retains its validity in the case of transient flight conditions and during vertical flight is not made clear in the documentation available but sacrifices in accuracy are probable. It may also be expected that that uneven input signals—due, for example, to the large amount of adjustment activity on the part of the pilot necessary to control the weakly stable helicopter behaviour—will make the results substantially worse. Filtering of the input control signals is proposed to improve the "selectivity" of the corresponding measurement parameters; filtering generally causes a substantial deterioration in the time behaviour.

Investigations have also shown that the separate calculation of the longitudinal and lateral velocity (VIMI) is not sufficient to achieve satisfactory longitudinal and lateral velocity accuracies over a large airspeed range because of the coupling between the longitudinal and lateral motion of the helicopter.

In the FAULKNER method, it is assumed that the reaction of the rotor system permits usable conclusions about the airspeed in the lower speed range. The method is based on the differential equation for the flapping motion of the rotor blades.

The quasi-steady system of differential equations for the flapping motion is solved and resolved into longitudinal and lateral velocity components, i.e it is inverted. The input parameters in this quite highly developed system are the cyclic and collective control positions, the rotational speeds and the rotor mast moment; these are used to calculate the flap coefficients.

This method requires a very good insight into the flight mechanics and aerodynamics relationships of the helicopter rotor. In order to obtain solutions, additional empirical assumptions with respect to the flow through the rotor are necessary. Measurement traces from flight tests using the "FAULKNER" method indicate satisfactory agreement between the speed curves. The lateral velocity steady state accuracy is not completely satisfactory. Here again, no information is available on the extent to which the method remains usable in climb and descent flight.

Reference may be made at this point to the fundamental problem of the high level of sensitivity to noise in the input signals when inverting the systems of equations. In the present case, noise should also be understood to mean high frequency position signal alterations. In the measurement traces, this is reflected in the estimated airspeeds, which are sometimes very noisy when compared with the reference velocities from the Doppler system.

The LAASH method only applies to slow horizontal flight because it is only under these conditions that, for a known flight weight, there is an unambiguous relationship between the collective control position and the magnitude of the airspeed. For a known roll angle, characteristic control curves against the yaw angle can be produced as a function of the magnitude of the flight speed.

In the LAASH method, the magnitude of the flight speed determined from the collective control signal is used to select the control characteristics (allocation of cyclic control to yaw angle) appropriate to this speed from a data file and hence to determine the yaw angle. Ambiguities exist in both the longitudinal and lateral control curves, i.e. various yaw angle values are possible. Because of the phase shift between the two control curves, it is possible to decide on an appropriate yaw angle by comparison.

The collective control positions in the hover and transition ranges (25 m/s $\leq$ V $\leq$ 35 m/s) have only small gradients against airspeed, which is itself sufficient to make the determination of the magnitude of the flight speed subject to errors. Precisely in the hover range, furthermore, the allocation of the cyclic control positions to the yaw angle depends greatly on the flight speed so that, overall, the sensitivity to measurement errors and changes in parameters is very large.

Disadvantageous in this method is the ambiguity of the control positions with respect to the flight speed; thus, for example, the same collective control position is necessary in hover and at a airspeed of approximately 45 m/s. Since LAASH takes no account of this ambiguity, a preliminary estimate of the current speed range is necessary. LAASH is therefore associated with two severe conditions which greatly limit its practical usability.

In the indirect (analytical) methods, therefore, the airspeed is determined by using flight mechanics relationships. In all the methods, only the steady state or quasi-steady relationships are used. In the end, all the methods are based on incomplete flight mechanics models so that more or less substantial errors appear—depending on the maneuvers flown.

Summarising, the following can be concluded with respect to the systems and methods described:

All the sensor systems are directly affected by the flight condition of the rotor. The strong dependence of the rotor flow condition on the flight maneuvers has an unfavourable effect on the accuracy of the sensor system and, in some cases, requires error compensation which depends on the flight condition.

The analytical methods exploit the fact that in slow flight, large control changes lead to small changes to velocity and direction. An advantageous feature of the analytical methods is the low vulnerability, because all the sensors necessary are accomodated in the fuselage.

Analytical methods have advantages in principle over solutions depending on technical devices. The known analytical methods, however, can only be used with limitations—LAASH and the "FAULKNER" method only apply in hover and slow speed flight and even in the case of the VIMI method, it is to be expected that the non-linear curves of the control deviations and positional angles against airspeed may lead to substantial sacrifices in accuracy if not, in fact, to the failure of the method.

In none of the methods is the vertical velocity component (and the total angle of incidence) determined and the airspeed determination is, therefore, incomplete.

SUMMARY OF THE INVENTION

The objective of the invention is to indicate a system, valid over the whole of the airspeed range of the helicopter, for determining the airspeed, the system being valid during both steady flight and dynamic maneuvers.

This objective is achieved, in accordance with the invention, by the features exhibited in claim 1. Desirable embodiments of the invention are exhibited in the subclaims.

In the present invention, the airspeed is determined by means of a coupled measurement device which processes the control positions, the attitude angles and the 5 rotational velocities. If the flightpath velocity is also measured and suitable included in the circuit, the accuracy can be increased during flight maneuvers and the wind speed can be determined. Adaptation to the atmospheric conditions can be made from the measured parameters of air temperature $T_s$ and static pressure $p_s$.

In the method for determining the airspeed, the measured values of the control positions, pitch angles, roll angles and rotational speeds are supplied to a computer unit. Using the calculated airspeed, the method is adapted to the actual flight condition (high speed, slow speed, lateral and vertical flight) and the three airspeed components (longitudinal, lateral, vertical) calculated using the measured parameters mentioned.

The advantage of this system relative to existing proposals for a solution consists in the fact that all three airspeed components and the magnitude of the airspeed and incidence and yaw angles are determined, the method works correctly even in the case of flight maneuvers and does not supply average values only, because of the internal and clearly divided structure of the method, adaptation to atmospheric changes or changes caused by the configuration can be made simply and exactly, the calculation method can be adapted to the current flight condition so that satisfactory allowance can be made for helicopter properties which alter greatly with flight condition.

The invention is presented using drawings and is described in detail below.

DETAILED DESCRIPTION OF THE INVENTION

From the LUENBERGER theory, it is known that—using state observers—conclusions can be drawn on unknown (unmeasurable) condition parameters from known (measurable) parameters. For a dynamic process with the state vector x and the model matrix of the system behaviour A and the vector of the input parameters u and the model matrix of the input behaviour B $$x = A\,x + B\,u \qquad (3)$$

and, using the measurable output vector $$y = C\,x \qquad (4)$$

a model is developed and operated with the same input parameters u as the process itself. By feeding back the difference between the measured and estimated output parameters $y = y - y$ and amplifying by K, the transmission behaviour of the observer can be adapted to the particular problem. This therefore gives the differential equation system of the observer:

$$x = A\,x + B\,u + KC\,(x - x). \qquad (5)$$

Figure 1:
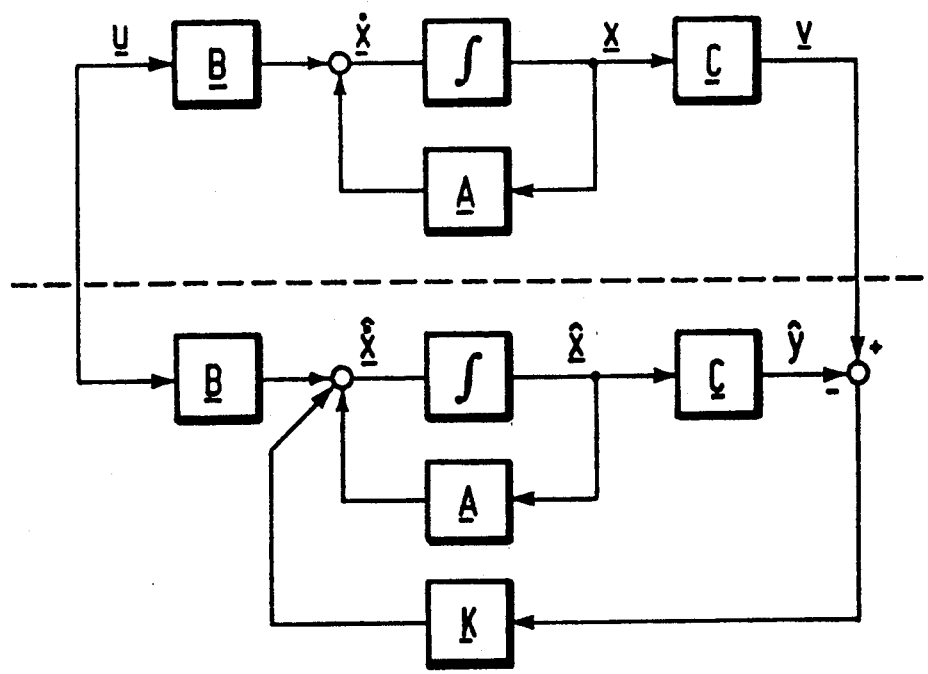
FIG. 1 shows the block diagram of an observer, from LUENBERGER.

FIG. 1 shows, from LUENBERGER, the block circuit diagram of a dynamic process with an observer.

The differential equation system for the error in the estimate is obtained from the difference between Equations (3) and (5):

$$x = (A - KC)\,x. \qquad (6)$$

Equation (16) represents a homogeneous differential equation system whose steady state solution is the null vector, i.e. even in the case of initial values not identical with the process, the observer supplies the complete condition free of errors once the initial errors have decayed.

The basis for an observer, therefore, is the mathematical modelling of the process behaviour. The core of the invention is a dynamic model (which is simple and easily adapted to the physical realities of the helicopter) of the helicopter motion and appropriate allowance in the observer for the properties of the helicopter which change with the flight condition.

Since, in the present problem, only the motion of the centre of gravity of the helicopter is of interest, the differential equation system of the motion of a rigid helicopter is taken as the basis for the modelling. The force and momentum equilibrium conditions, represented in a coordinate system fixed relative to the helicopter, give the equation system:

$$\begin{bmatrix} m\ u_K \\ m\ v_K \\ m\ w_K \end{bmatrix} = m \begin{bmatrix} 0 & r & -q \\ -r & 0 & p \\ q & -p & 0 \end{bmatrix} \begin{bmatrix} u_K \\ v_K \\ w_K \end{bmatrix} + \qquad (7)$$

$$mg \begin{bmatrix} -\sin\theta \\ \sin\Phi\ \cos\theta \\ \cos\Phi\ \cos\theta \end{bmatrix} + \begin{bmatrix} X^A \\ Y^A \\ Z^A \end{bmatrix}$$

$$\begin{bmatrix} I_x\ p \\ I_y\ q \\ I_z\ r \end{bmatrix} = \begin{bmatrix} 0 & r & -q \\ -r & 0 & p \\ q & -p & 0 \end{bmatrix} \begin{bmatrix} I_x\ p + B_x \\ I_y\ q + B_y \\ I_z\ r + B_z \end{bmatrix} +$$

$$\begin{bmatrix} 0 & -z & y \\ z & 0 & -x \\ -y & x & 0 \end{bmatrix} \begin{bmatrix} X^A \\ Y^A \\ Z^A \end{bmatrix} + \begin{bmatrix} L^A \\ M^A \\ N^A \end{bmatrix}$$

The differential equation system (7) describes the equilibrium of the inertial, aerodynamic and weight forces and moments. Whereas the inertial forces and moments depend on the inertial state parameters $v_K$, $\Omega$ and the weight forces depend on the attitude angles $\Phi$, $\theta$, the aerodynamic forces and moments are derived from the motion of the aircraft relative to the surrounding air. Assuming that the dimensions of the aircraft are small relative to the wavelengths of the air motions, the following relationship applies $$V_K = V + V_W. \qquad (8)$$

which states that the flightpath velocity $V_K$ is vectorially composed of the airspeed V and the wind velocity $V_W$. In an analogous manner, the rotational velocities are given by:

$$\Omega = \Omega_A + \Omega_W. \qquad (9)$$

An approximately complete calculation of the aerodynamic forces and moments, which is only generally formulated in Equation (7), is very complex and is not therefore practical for problems such as the present one. If only the motion of the helicopter idealised as a rigid body is of interest, a series expansion in terms of the condition and setting parameters is sufficient to describe the aerodynamic forces and moments $$X^A = X_u u_A + X_v v_A + \ldots + X_{\delta_L}\delta_L + \ldots \qquad (10)$$

The forces and moments are usually represented by derivative dependent on the helicopter configuration, e.g.

$$X_u = c_{X_u} q_{Ro} S. \qquad (11)$$

In this, $c_{X_u}$ represents the non-dimensional longitudinal derivative $dc_X/du_A$, S is a reference area usually the rotor disc area in the case of helicopters). The dynamic pressure $L_R$ refers to the peripheral velocity $U_{Ro}$ in the case of helicopters so that sensible values are possible even in hover:

$$q_{Ro} = \rho_s/2 U_{Ro}^2. \qquad (12)$$

The air density can be represented as a function of the measurable parameters static pressure $\rho_s$ and air temperature $T_s$ and of the special gas constant for air R:

$$\rho_s = \frac{p_s}{R T_s}. \qquad (13)$$

Because of the sometimes widely varying behaviour of the helicopter with airspeed, no satisfactory description of the aerodynamic forces and moments over a wide range of flight conditions can be obtained from the, use of (9), (10) and (11) and constant derivatives. In order to model the behaviour of the helicopter over a wide range of flight conditions, linear derivative models are used for different airspeeds and interpolation is performed between the individual sets of derivatives. There is, in other words continuous switching between the models. The aerodynamic forces and moments are, therefore, calculated according to the prescription $$\begin{bmatrix} X^A \\ Y^A \\ Z^A \\ L^A \\ M^A \\ N^A \end{bmatrix} = A^* \begin{bmatrix} u_A \\ v_A \\ w_A \\ p_A \\ q_A \\ r_A \end{bmatrix} + B^* \begin{bmatrix} \delta_L \\ \delta_Q \\ \delta_K \\ \delta_S \end{bmatrix}, \qquad (14)$$

the following applying to the aerodynamic and input matrices:

$$A^* = A^*_0 + u_A A^*_1 + u^2_A A^*_2 + u^3_A A^*_3 + \ldots, \qquad (15)$$

$$B^* = B^*_0 + u_A B^*_1 + u^2_A B^*_2 + u^3_A B^*_3 + \ldots \qquad (16)$$

The derivative for the reference conditions are generally made available by the helicopter manufacturer.

The appropriate polynomial order in Equations (15, 16) depends on the properties of the particular helicopter. The use of the third power of the flight speed in the interpolation in Equations (15, 16) is generally sufficient. Although the variation with the dynamic pressure could already have been taken into account using a quadratic law, it is desirable to use a higher law because, in the case of the flow onto the rotor, the airspeed is superimposed on the local peripheral speed of the rotor. A cubic law in accordance with Equations (15, 16) has been found to be very appropriate.

Where no extreme deviation from the longitudinal flight conditions are flown, it is not necessary to adapt the aerodynamic system matrices and input matrices to the lateral or vertical velocity components because the linear relationships are sufficiently accurate in the immediate vicinity of the current operating point. If it is also necessary to deal with large deviations from purely longitudinal flight with satisfactory accuracy, relationships analogous to Equations (15, 16) are conceivable in which the lateral or vertical velocity components or even combinations of all three components are used to adapt the aerodynamic matrices to the current conditions.

Because of the relationships shown in Equations (11, 12), it is necessary to take account of the current atmospheric conditions because the aerodynamic forces and moments depend on the air density $\rho_s$. Because the derivative refer to the standard atmosphere, the "aerodynamic matrices" $A^*$ and $B^*$ in Equation (15) have to be additionally multiplied by the factor $\rho_s/\rho_n$, so that, together with (13):

$$A' = (p_s/p_n)(T_n/T_s)A^*, \qquad (17)$$

$$B' = (p_s/p_n)(T_n/T_s)B^*. \qquad (18)$$

The system matrices and the input matrices are adapted to the current conditions in Equations (15, 16) by means of the arriving flow components $u_A$, $v_A$ and $w_A$, which are available as calculated values and not as directly measured parameters. The present system differs in this respect from conventional approaches in which measured parameters are used for adapting the model.

Figure 2:
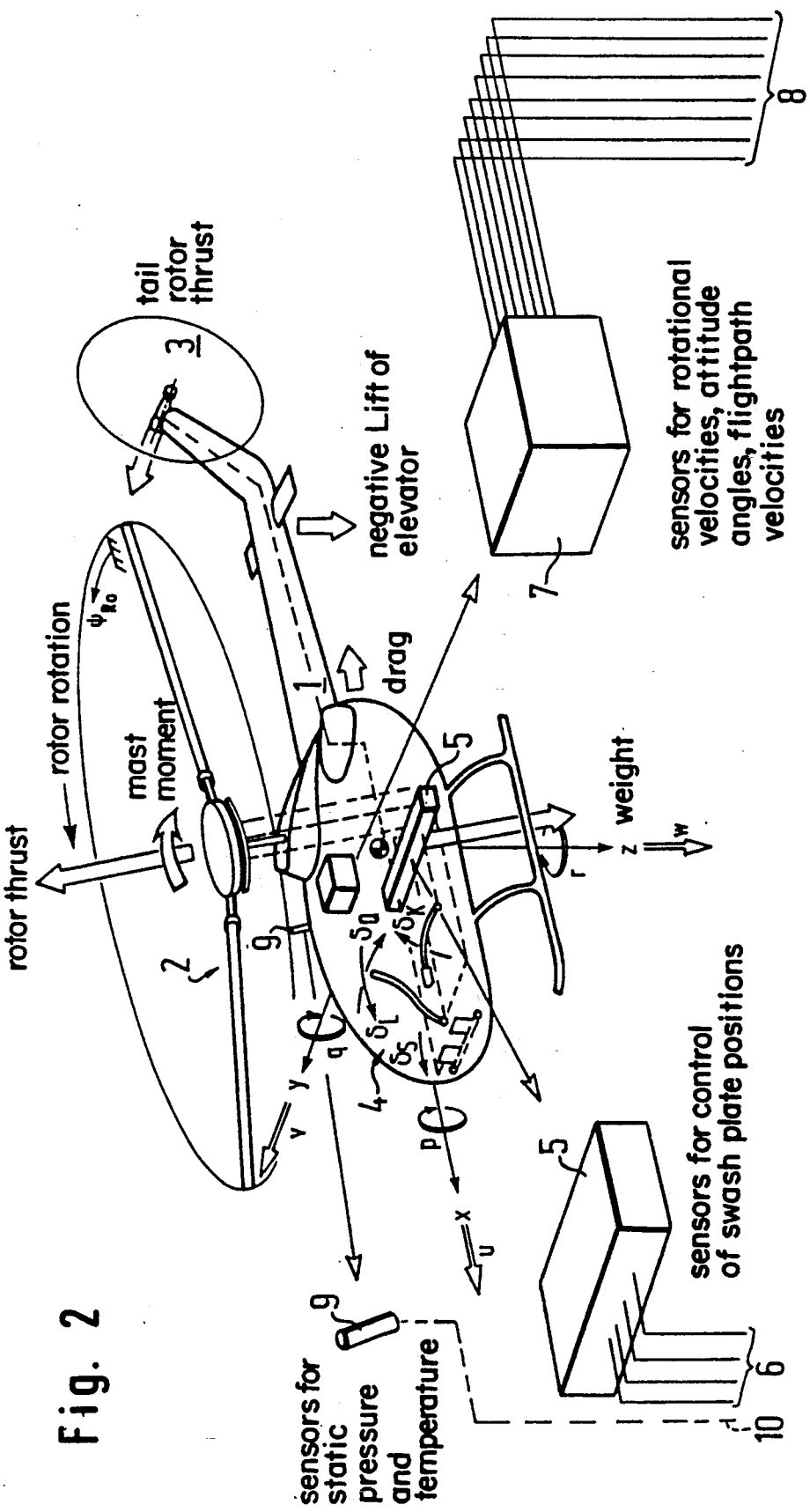
FIG. 2 diagrammatically indicates a helicopter with its control units and sensors.

If the flightpath velocity vector $V_K = [u_K, v_K, w_K]^T$ is also available (as output from a Doppler navigation system, for example), the accuracy in curved flight can be improved by using the measured flightpath velocity $V_K$, instead of the estimated flight speed V, for determining the inertia forces. FIGS. 2 ... 5 show the functional principle of the system for determining the airspeed.

The equation system (7) is represented by the circuits shown in the block circuit diagrams, account being taken of (15, 16). The system is coupled to the flight condition of the helicopter via the correction terms.

Since most theoretically derived models do not correspond exactly to the real world conditions, a further method is given below for increasing the steady state accuracy of the system; the computational effort for the method presented can, in fact, be reduced.

In trimmed (steady state) flight conditions, no accelerations occur, i.e.:

$$x = A \, x_{Tr} + B \, u_{Tr} 0. \qquad (19)$$

If the observer has to operate without estimating errors under steady state conditions, the observer s acceleration parameters must also disappear. Because $x_{Tr} - x_{Tr}0$, therefore:

$$x = A\ x_{Tr} + B\ u_{Tr}0. \tag{20}$$

In the presence of model errors, i.e.

$$A = A + \Delta A \text{ and } B = B + \Delta B$$

(20) is not satisfied. If, however, the observer has to operate without estimating errors under steady state conditions, compensation is necessary for the model errors and this can take place as follows. The condition and input parameters valid for the trimmed condition (which can be relatively easily measured) are substituted into the differential equation system and this provides the acceleration parameters which prevent the observer from adopting a steady state condition:

$$f = x = \Delta A\ x_{Tr} + \Delta B\ u_{Tr}.$$

If these acceleration parameters are subtracted from the differential equation system (20), it is possible to ensure that the observer operates steady state under trimmed flight conditions without estimating errors, despite erroneous modelling $$x = A\ x + B\ u + KC(x - x) - f(x). \tag{22}$$

The correction term f(x) is not normally constant for all conditions. Since, however, it is possible to represent the "observer error" from Equation (21) as a function of suitable condition parameters, good approximations can be achieved by the use of polynomials—by analogy with Equations (15, 16).

FIG. 2 diagrammatically indicates a helicopter 1 with controllable main rotor 2 and tail rotor 3. The helicopter is equipped with control units 4 for cyclic $\delta_L$, $\delta_Q$ and collective $\delta_K$ main rotor blade adjustment and for tail rotor adjustment $\delta_S$.

The control positions are measured by suitable sensors (displacement or angle pick-ups), which are here represented as the block 5. The measured values are fed as analog or digital electrical or light signals via conductors 6 to the signal processing system. It may be possible to do without the measurement and transmission of the tail rotor control position. It is important that the measured control positions should permit unambiguous allocation to the position of the rotor control (swash plate, "spider"). Where closed-loop control is employed, measurement should take place after each control action.

Also measured are the rotational velocities of the helicopter about the longitudinal axis p, about the transverse axis q and about the vertical axis r and also the roll angle $\Phi$ and the pitch angle $\Theta$ as attitude angles. In order to increase the accuracy in flight maneuvers with rotational velocities (e.g. curved flight), it is desirable to measure the flight path components in the helicopter longitudinal direction $u_K$, lateral direction $v_K$ and vertical direction $w_K$; for the functioning of the method in principle, however, it is not absolutely necessary. The sensors for the rotational velocities and the attitude angles are represented by the block 7. Their outputs, after being converted (if necessary) in a suitable manner, are fed via conductors 8 to the signal processing.

In order to adapt to atmospheric conditions and hence to increase the accuracy, sensors 9 are provided for the static pressure $p_s$ and the ambient temperature $T_s$; their outputs are converted by analogy with the control signals and transmitted via conductors 10.

Figure 3:
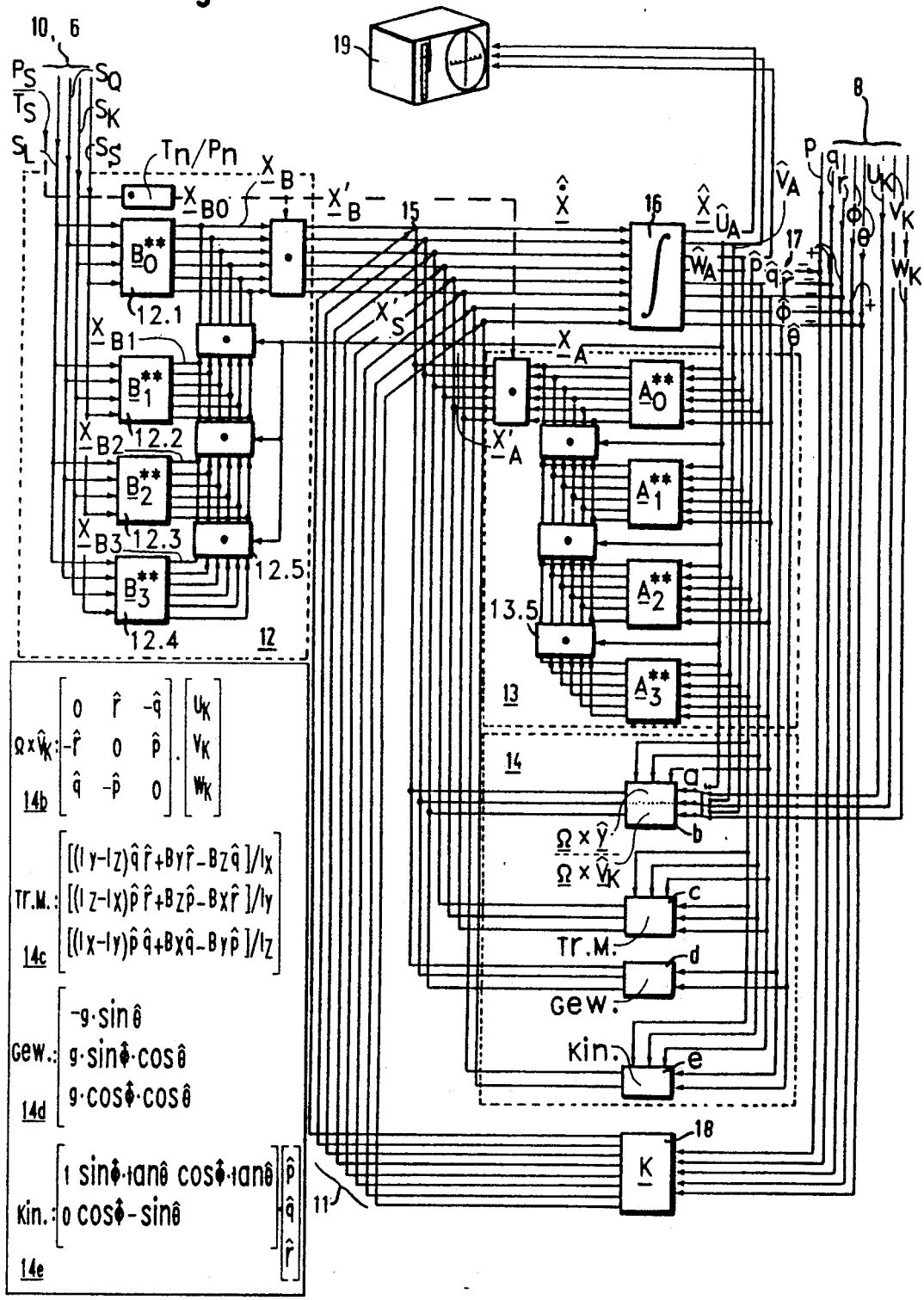
FIG. 3 shows a circuit for signal processing.

FIG. 3 shows a first embodiment form of a circuit for signal processing using the input conductors 6, 8 and 10 for the measurement data from the sensors 5, 7 and 9.

The circuit represents a coupled measurement device 11 which contains two models, each represented by blocks with dotted lines. Block 12 is the model of the input behaviour of the vehicle motion. Blocks 13 and 14 represent the model of the system behaviour of the vehicle.

The cyclic and collective control signals, possibly the signals from the lateral control position and, in addition, the signals for the air pressure $p_s$ and the ambient temperature $T_s$ are fed to Block 12 as input parameters. Block 12 contains amplification matrices $B_0$ to $B_3$ to which the input signals are fed. In the matrices, these signals are processed according to the following equation; for each of the six outputs $x_{Bij}$ of the four matrices $$x_{Bij} = B_{ij1}\delta_L + B_{ij2}\delta_Q + B_{ij3}\delta_K + B_{ij4}\delta_S \begin{matrix}(i = 0 \ldots 3)\\(j = 1 \ldots 6)\end{matrix} \tag{23}$$

i = 0 ... 3
j = 1 ... 6 applies. In this expression, $B_{ijk}$ are the derivatives of the input behaviour supplied by the manufacturer, which are available in a memory. Each of the amplification matrices $B_0$ to $B_3$ contains different derivatives, depending on the flight conditions. The outputs of the matrices $B_0$ to $B_3$ are mutually related in accordance with Equation 16, using the multipliers 12.5 and provide the output from the model in the form of the output vector $x_B$.

The individual vector elements are then each multiplied by the factors $p_s/p_n$ and $T_n/T_s$, giving the output vector $x'_B$.

By analogy with what was stated with respect to the model in Block 12, the estimated condition parameters of the translational velocities $u_A$, $v_A$ and $w_A$ and the rotational velocities p, q and r are associated with the amplification matrices $A_0$ to $A_3$, supplied by the manufacturer and stored, the multipliers 13.5 and the factors $p_s/p_n$ and $T_n/T_s$ in the model of the aerodynamic system behaviour in Block 13. They give the output vector $x'_A$ of Block 13. Further terms to take account of weight (Term 14d), the inertia forces and moments (Term 14c) and the kinematic relationships (Term 14e) are provided in Block 14 of the system behaviour model. Also provided in Block 14 is an element which is used to determine inertial acceleration forces and which can be subjected to estimated parameters (Position 14a) or measured parameters (Position 14b).

The equations given in FIG. 3 apply to the terms 14b, c, d and e.

The output parameters of Block 14 are additively applied to the output parameters of Block 13 with the exception of the kinematic relationship outputs of Block 14e. All the outputs of Blocks 13 and 14 lead to the output vector $x'_S$ of the system behaviour. The measured output parameters of the rotational velocities p, q and r and the attitude angles $\Phi$ and $\Theta$, which are present at the inputs 8, are compared at position 17 with the estimated condition parameters p, q and r and Φ and Θ and the differences switched to a correction matrix 18, in which connections take place by analogy with Equation (23). The eight outputs from the correction matrix 18 are additively associated at the addition position 15 with the output vectors $x'_B$ of Block 12 and the output vector $x'_S$ of Blocks 13 and 14. The output vector x of the sums, which is formed in this way, is fed to an integrator 16 whose output is the estimated state vector x. From this estimated state vector x, the estimated condition parameters of the three translational velocities $u_A$, $v_A$ and $w_A$ are supplied to an indication unit 19.

Figure 4:
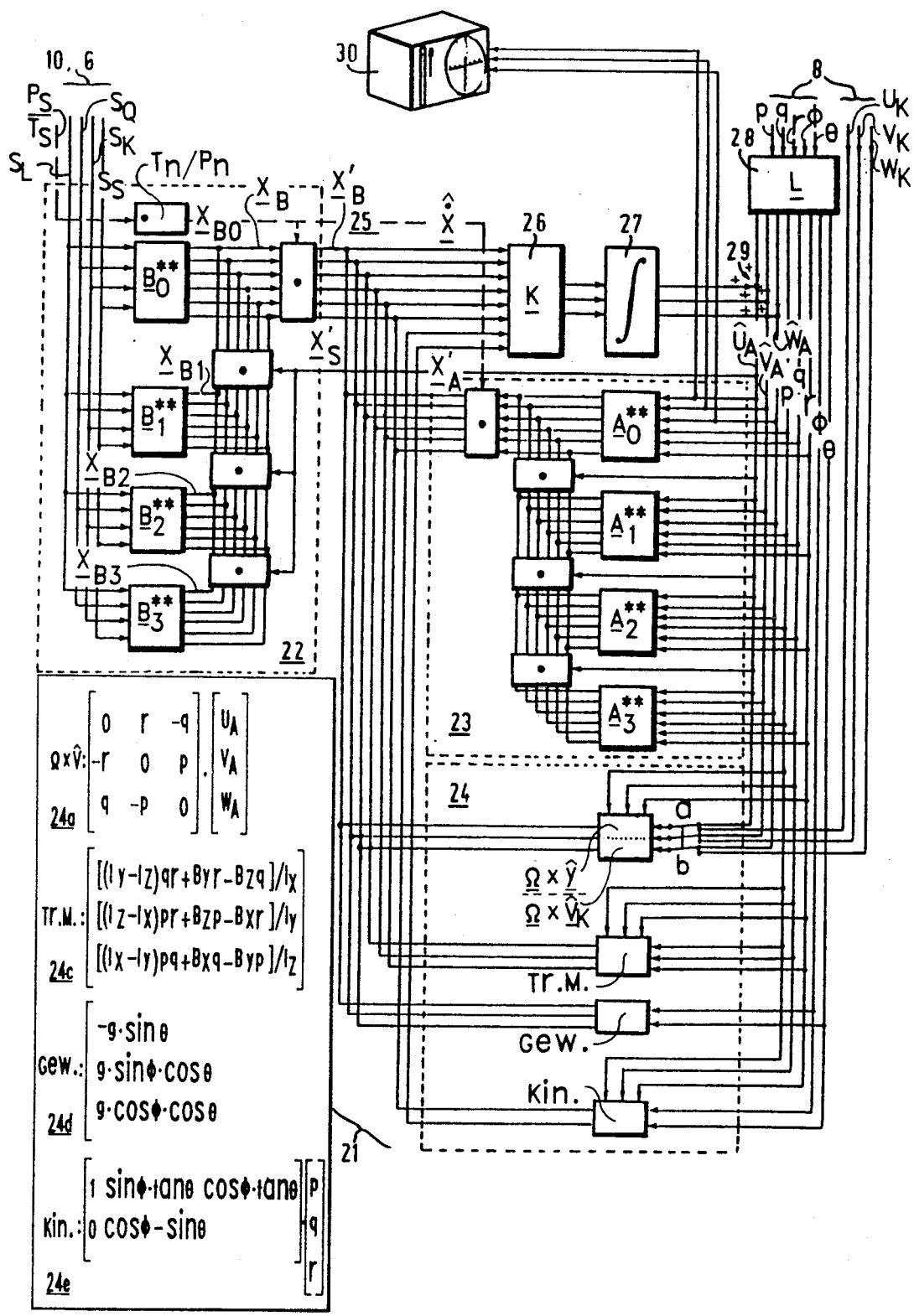
FIG. 4 shows an altered arrangement of the circuit of FIG. 3.

The circuit of FIG. 4 corresponds to a large extent to that of FIG. 3. The differences are that the inputs of Block 23, corresponding to Block 13 in FIG. 3, and of Block 24, corresponding to Block 14 in FIG. 3, are subjected to measured parameters for rotational velocity and attitude angle. The output vectors $x'_B$ and $x'_S$ are otherwise obtained in the same way and additively associated at an addition position 25.

The inputs 8 for the rotational velocities and the attitude angles are here supplied to a first correction term 28, in which they are connected by analogy with Equation (23). The first three outputs of the correction term 28 are connected to the (in this case) three outputs of the integrator 27 at the addition position 29 and provide the estimated airspeed components $u_A$, $v_A$ and $w_A$, which are fed to the blocks 23 and 24 of the model for the system behaviour and simultaneously to an indication device 30.

The outputs of the addition position 25 and also the output parameters for the kinematic relationships in the output vector $x'_S$ are fed to a second correction term 26, in which a connection is carried out corresponding to Equation (23). The three outputs of the correction term 26 are fed to the integrator 27.

Figure 5:
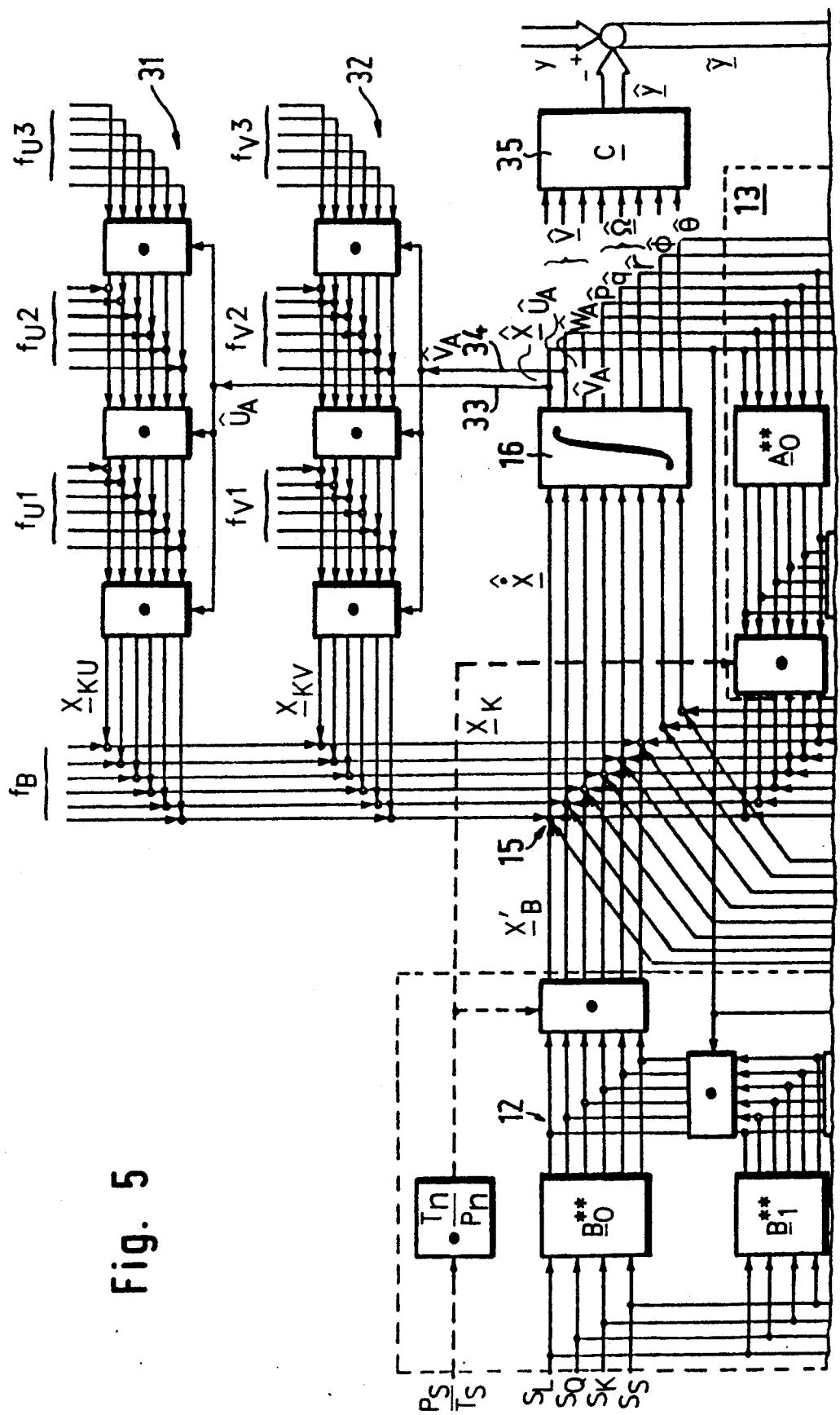
FIG. 5 shows a further alteration of the circuit of FIG. 3.

The circuit of FIG. 5 corresponds in its basic structure to that of FIG. 3. Only a part of it is reproduced here. A circuit 31/32 is here added to the circuit to compensate for steady state model errors. The estimated values for the air speed components $u_A$ and $v_A$, are supplied as input parameters to this circuit 31/32. The outputs $x_{Ku}$ and $v_{Kv}$, of the two circuit branches 31/32 are given by the equation $$x_{Ku} = u_A f_{u1} + u_A^2 f_{u2} + u_A^3 f_{u3}. \quad (24)$$

This equation also applies analogously to $x_{Kv}$.

The output parameters $x_{Ku}$ and $x_{Kv}$ which depend on the velocity components $u_A$ and $v_A$, have a constant vector $f_0$ added to them. The overall sum $x_K$ is additionally fed to the addition position 15. A compensation circuit, as shown in FIG. 5, can also be provided in the circuit of FIG. 4. In this case, the output vector is fed to the addition position 25.

The compensation vectors $f_0$, $f_{ui}$ and $f_{vi}$ are determined by the method of Equations (14) to (22). Triple multiplication with the estimated airspeed components $u_A$ and $v_A$ takes place at the circuits 31 and 32. Polynomials of higher or lower order can also be used. This also applies to the multiplication by the estimated airspeed component $u_A$ in the circuits of FIGS. 3 and 4.

A matrix C 35 which is subject to the output parameters of the integrator 16 is provided in FIG. 5. This matrix takes account of the fact that not all the condition parameters are measureable and that only corresponding parameters are therefore available for comparison at the comparison position for the estimated and measured output parameters y and y. The vector of the estimation error y consists of the differences between the estimated and measured rotational velocities p, q and r and the measured and estimated attitude angles Φ and Θ.

It should also be mentioned that, instead of the velocity parameter $u_A$ which depends on the current conditions, the velocity parameter $v_A$ and also measured parameters (if available) can be used as multipliers in Blocks 12 and 13 or 22, 23 for adaptation to the current flight conditions.

When the compensation circuit of FIG. 5 is used, it may be possible, under certain circumstances, to dispense with the adaption of Blocks 12, 13 or 22, 23 to the flight conditions by multiplication with $u_A$.

Instead of the three airspeed components, it is also possible to determine the magnitude of the airspeed and the incidence and yaw angles.

Using a method analogous to the adaptation to the translational flight condition, adaptation to curved flight could also be undertaken by suitable use of the rotational velocities or attitude angles and this would effect an improvement to the accuracy achieved in this case.

The fact that information on the flight weight and the position of the centre of gravity of the helicopter has to be provided in advance (by the pilot inserting the corresponding numerical values for the computer unit via a keyboard, for example) represents a certain disadvantage. The flight weight of the helicopter can also, however, be determined in the following way. Since erroneous information of the flight weight leads to an erroneous estimation of the vertical velocity, it is possible—if a variometer (barometric vertical velocity) is available—to use a comparison of the measured and calculated vertical velocity to adjust the value of the flight weight used in the observer until the vertical velocity error disappears. This not only makes the modelling in the observer correct, it makes the calculated flight weight available to the pilot for, for example, performance calculations.

| | Symbols |
|---|---|
| $\underline{A}$ | System matrix |
| $\underline{A}^*$ | System matrix of the aerodynamic forces and moments |
| $\underline{A}^{**}$ | System matrix of the aerodynamic forces and moments, normalised on mass and moment of inertia |
| $\Delta \underline{A}$ | Model error of the system matrix |
| $\underline{B}$ | Input matrix |
| $\underline{B}^*$ | Input matrix of the aerodynamic forces and moments |
| $\underline{B}^{**}$ | Input matrix of the aerodynamic forces and moments, normalised on mass and moment of inertia |
| $\Delta \underline{B}$ | Model error of the input matrix |
| $B_{ijk}$ | Coefficients of the input matrix, 1 = 1..3, j = 1..6, k = 1..4 |
| $\underline{C}$ | Output (measurement) matrix |
| $\underline{I}$ | Unity matrix |
| I | Moment of inertia |
| $\underline{K}$ | Correction matrix |
| $L^A$ | Aerodynamic roll moment |
| $M^A$ | Aerodynamic pitch moment |
| $N^A$ | Aerodynamic yaw moment |
| S | Reference area |
| $T_n$ | Reference temperature = 288.15K |
| $T_s$ | Ambient temperature |
| $U_{Ro}$ | Rotor peripheral velocity |
| $\underline{V}$ | Airspeed vector $\underline{V} = [u_A, v_A, w_A]^T$ |

| Symbols | |
|---|---|
| $\underline{V}_K$ | Flightpath velocity vector $\underline{V}_K = [u_K, v_K, w_K]^T$ |
| $\underline{V}_W$ | Wind velocity vector $\underline{V}_W = [u_W, v_W, w_W]^T$ |
| V | Magnitude of the airspeed |
| $X^A$ | Aerodynamic longitudinal force |
| $Y^A$ | Aerodynamic lateral force |
| $Z^A$ | Aerodynamic vertical force |
| $\underline{f}_O$ | Correction vector |
| $\underline{f}_u$ | Correction vector for longitudinal velocities |
| $\underline{f}_v$ | Correction vector for lateral velocities |
| $h_i$ | Amplification coefficient for VIMI |
| m | Mass |
| $p_n$ | Reference pressure = 1013.25hpa |
| $p_s$ | Static pressure |
| p | Roll rate |
| q | Pitch rate |
| $q_{Ro}$ | Dynamic pressure on the tip of the rotor blade |
| r | Yaw rate |
| $\underline{u}$ | Input vector $\underline{u} = [\delta_L, \delta_Q, \delta_K, \delta_S]^T$ |
| u | Longitudinal velocity |
| v | Lateral velocity |
| w | Vertical velocity |
| $\underline{x}$ | state vector $\underline{x} = [u_A, v_A, w_A, p, q, r, \Phi, \theta]^T$ |
| x | Longitudinal coordinate |
| $\underline{y}$ | Output vector $\underline{y} = [p, q, r, \Phi, \theta]^T$ |
| y | Lateral coordinate |
| z | Vertical coordinate |
| $\alpha$ | Incidence angle |
| $\beta$ | Yaw angle |
| $\delta K$ | Collective control position |
| $\delta_L$ | Longitudinal control position ⎫ Cyclic control |
| $\delta_Q$ | Lateral control position ⎬ positions |
| $\delta_S$ | tail rotor control position |
| $\rho_n$ | Air density at p = 1013.25hpa, T = 288.15K |
| $\rho_s$ | Air density |
| $\Phi$ | Roll angle |
| $\theta$ | Pitch angle |
| $\underline{\Omega}$ | Rotational vector $\underline{\Omega} = [p, q, r]^T$ |
| ˆ | Estimated parameter |
| ~ | Difference between measured and estimated parameter |

I claim:

1. A system for determining longitudinal, lateral and vertical airspeeds of a helicopter including a controllable main rotor and control means for cyclic and collective blade adjustment of said main rotor comprising:

means for sensing cyclic and collective control positions;

means for sensing attitude angles for pitch and roll attitudes;

means for sensing rotational velocities about x, y and z axes of said helicopter;

means for determining estimated longitudinal, lateral and vertical velocities of said helicopters;

a first model representing an input behaviour of the helicopter in motion, said first model having said cyclic and collective control positions as input parameters, said first model including a first memory in which at least two sets of derivatives of input behaviour of said helicopter for different flight conditions are stored, said first memory having a switched parallel circuit structure, said first model switching between said sets of derivatives, applying said input parameters in parallel to said sets of derivatives and outputting a first set of output parameters, said first model further including means for interpolating said first set of output parameters;

a second model representing a system behaviour of the helicopter, said second model having the estimated values of said rotational velocities and said estimated longitudinal, lateral and vertical velocities as input parameters, said second model including a second memory in which at least two sets of derivatives of the system behaviour of the helicopter for different flight conditions are stored, said second memory having a switched parallel circuit structure, said second model switching between said sets of derivatives, applying said input parameters in parallel to said sets of derivatives and outputting a second set of output parameters, said second model further including means for interpolating said second set of output parameters;

an addition stage for obtaining the algebraic sums of the output parameters of said first and second models;

means for obtaining integrals of said algebraic sums, said integrals representing estimated values of the output parameters of said second model including said longitudinal, lateral and vertical velocities;

means for obtaining a difference between said estimated parameters and said measured parameters of said attitude angles for pitch and roll and of said rotational velocities;

means provided with said differences for determining correcting parameters in dependence on said differences and adding said correcting parameters at said addition stage; and indication means for indicating values of said longitudinal, lateral and vertical velocities of said helicopter, said values being true values when said difference is zero.

2. The system as claimed in claim 1 including circuit means for adapting the output parameters of said first and second models to actual flight conditions, said circuit means applying the estimated values of said longitudinal, lateral and vertical velocities to derivatives of the input behaviour for said actual flight conditions, and outputting a set of adapted output parameters to said addition stage.

3. The system as claimed in claim 2, wherein said circuit means includes a multiplication stage for multiplying said estimated values of said longitudinal, lateral and vertical velocities with polynomials of at least a second order.

4. The system as claimed in claim 1 further comprising:

means for determining values of static pressure and temperature of ambient air;

circuit means for calculating a value of air density from said values of pressure and temperature; and circuit means for multiplying said value of air density with said sets of output parameters from said first and second models.

5. A system for determining longitudinal, lateral and vertical airspeeds of a helicopter including a controllable main rotor and control means for cyclic and collective blade adjustment of said main rotor comprising:

means for sensing cyclic and collective control positions;

means for sensing attitude angles for pitch and roll attitudes;

means for sensing rotational velocities about x, y and z axes of said helicopter;

a first correcting stage having said rotational velocities and said pitch and roll attitude angles as input parameters, said first correcting stage outputting estimated longitudinal, lateral and vertical velocities;

a first model representing an input behaviour of the helicopter in motion, said first model having said cyclic and collective control positions as input parameters, said first model including a first memory in which at least two sets of derivatives of input behaviour of said helicopter for different flight conditions are stored, said first memory having a switched parallel circuit structure, said first model switching between said sets of derivatives, applying said input parameters in parallel to said sets of derivatives and outputting a first set of output parameters, said first model further including means for interpolating said first set of output parameters;

a second model representing a system behaviour of the helicopter, said second model having the estimated values of said rotational velocities and said estimated longitudinal, lateral and vertical velocities as input parameters, said second model including a second memory in which at least two sets of derivatives of the system behaviour of the helicopter for different flight conditions are stored, said second memory having a switched parallel circuit structure, said second model switching between said sets of derivatives, applying said input parameters in parallel to said sets of derivatives and outputting a second set of output parameters, said second model further including means for interpolating said second set of output parameters;

an addition stage for obtaining the algebraic sums of the output parameters of said first and second models;

a second correcting stage including means for determining correcting parameters for said estimated longitudinal, lateral and vertical velocities in dependence on derivatives of input behaviour for actual flight conditions, and outputting corrected longitudinal, lateral and vertical velocities of said helicopter;

an integration stage for obtaining integrals of said corrected longitudinal, lateral and vertical velocities;

means for comprising said estimated and said corrected longitudinal, lateral and vertical velocities; and indication means for indicating the corrected values of said longitudinal, lateral and vertical velocities of said helicopter as provided by said integration stage.

6. The system as claimed in claim 5 including circuit means for adapting the output parameters of said first and second models to actual flight conditions, said circuit means applying the estimated values of said longitudinal, lateral and vertical velocities to derivatives of the input behaviour for said actual flight conditions, and outputting a set of adapted output parameters to said addition stage.

7. The system as claimed in claim 6, wherein said circuit means includes a multiplication stage for multiplying said estimated values of said longitudinal, lateral and vertical velocities with polynomials of at least a second order.

8. The system as claimed in claim 5 further comprising:

means for determining values of static pressure and temperature of ambient air;

circuit means for calculating a value of air density from said values of pressure and temperature; and circuit means for multiplying said value of air density with said sets of output parameters from said first and second models.

* * * * *